United States Patent [19]
Yeager

[11] Patent Number: 6,167,402
[45] Date of Patent: Dec. 26, 2000

[54] HIGH PERFORMANCE MESSAGE STORE

[75] Inventor: William J. Yeager, Menlo Park, Calif.

[73] Assignee: Sun Microsystems, Inc., Palo Alto, Calif.

[21] Appl. No.: 09/067,537

[22] Filed: Apr. 27, 1998

[51] Int. Cl.[7] .................................................. G06F 17/30
[52] U.S. Cl. .......................... 707/10; 709/206; 709/207; 358/402
[58] Field of Search .............................. 707/10; 709/206, 709/207; 358/402

[56] References Cited

U.S. PATENT DOCUMENTS

| | | | |
|---|---|---|---|
| 5,613,108 | 3/1997 | Morikawa | 707/200 |
| 5,644,404 | 7/1997 | Hashimoto et al. | 358/402 |
| 5,870,549 | 2/1999 | Bobo, II | 709/206 |
| 5,999,932 | 12/1999 | Paul | 707/10 |
| 6,029,164 | 2/2000 | Birrell et al. | 707/3 |
| 6,073,137 | 6/2000 | Brown et al. | 707/104 |

OTHER PUBLICATIONS

Crispin, M., "Internet Message Access Protocol," *University of Washington*, (1996), pp. 1–93.

*Primary Examiner*—Thomas G. Black
*Assistant Examiner*—William Trinh
*Attorney, Agent, or Firm*—Beyer Weaver & Thomas, LLP

[57] ABSTRACT

A product and method are disclosed for creating an efficient message store and delivery system is provided. A message store having an index directory, index file, and data bucket area, all of which are page based, is described. Each page corresponds to a period of time, such as a day. Each data bucket contains message data and the actual content of the message. The index file contains index file cells which store index information characterizing an associated message. The index directory contains index directory cells which store information on the location of an associated index file cell, and is thereby associated with a message. It also includes page based user folders each having user cells which reference a message, associated with a user, in the user store. A message includes a reference pointer to an associated index file cell and a reference pointer to an associated index directory cell. An index directory pointer in the user cell, an index file pointer in the index directory cell, a message pointer in the index file cell, and two pointers in the message allow the message store to reconstruct itself if necessary.

38 Claims, 12 Drawing Sheets

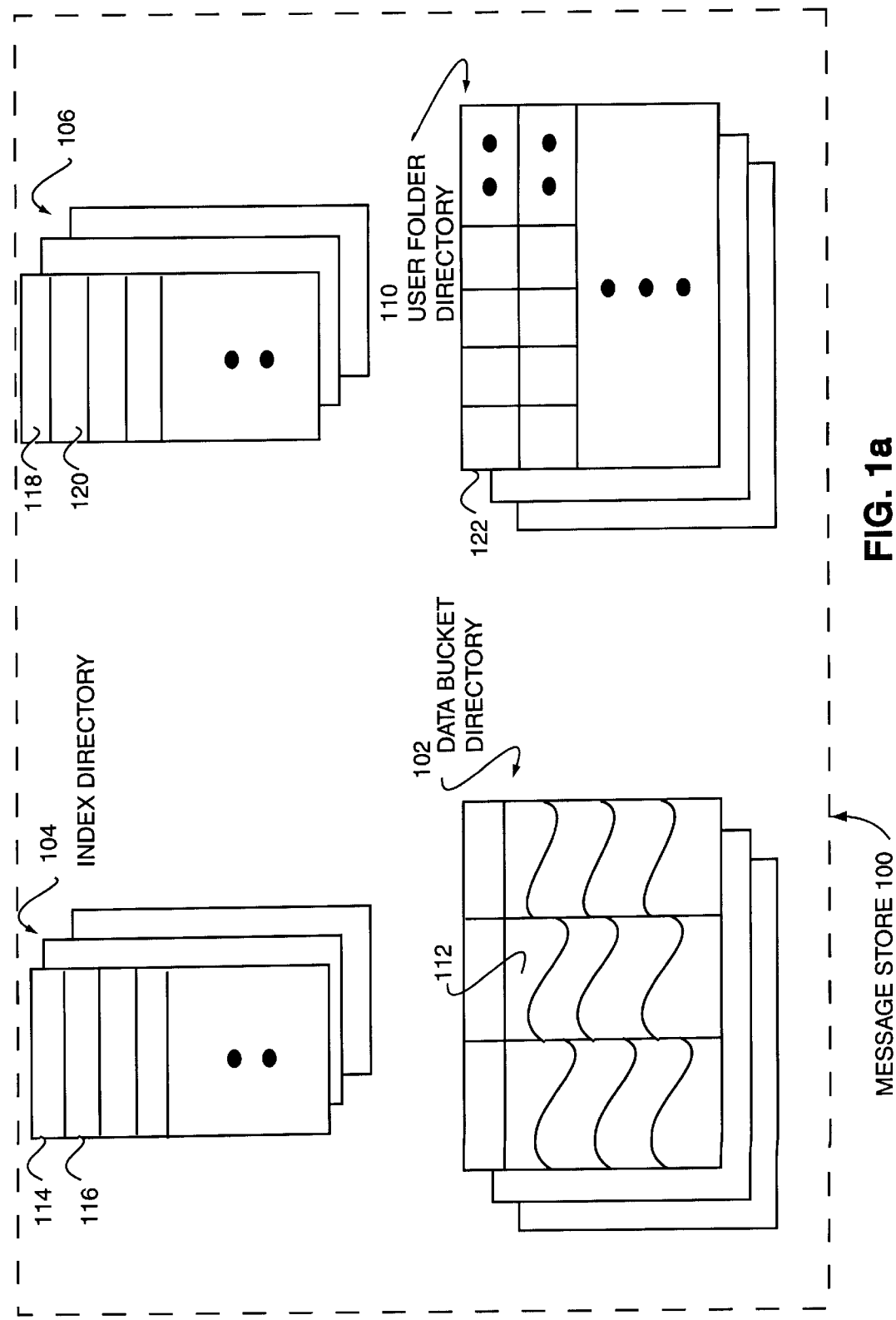

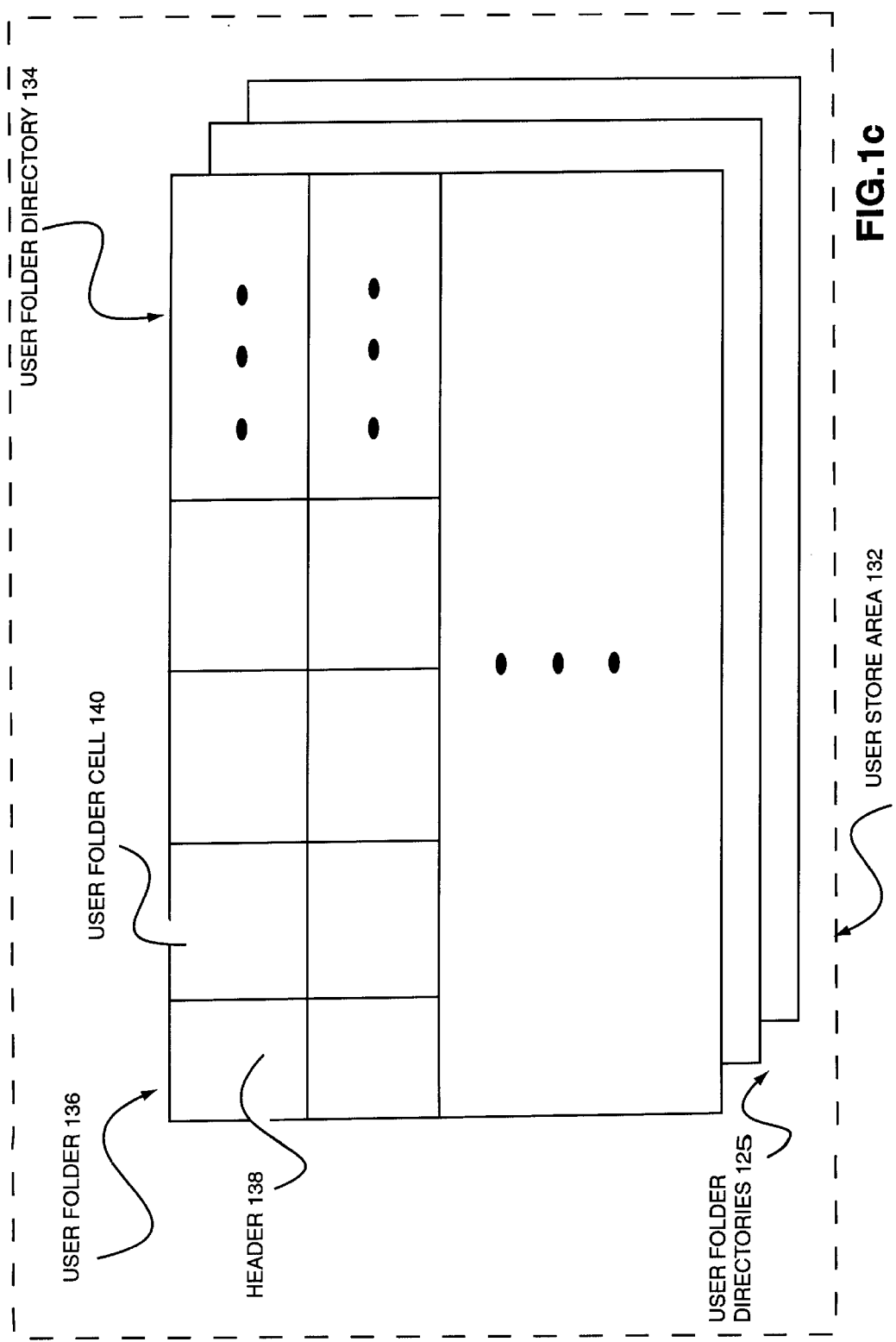

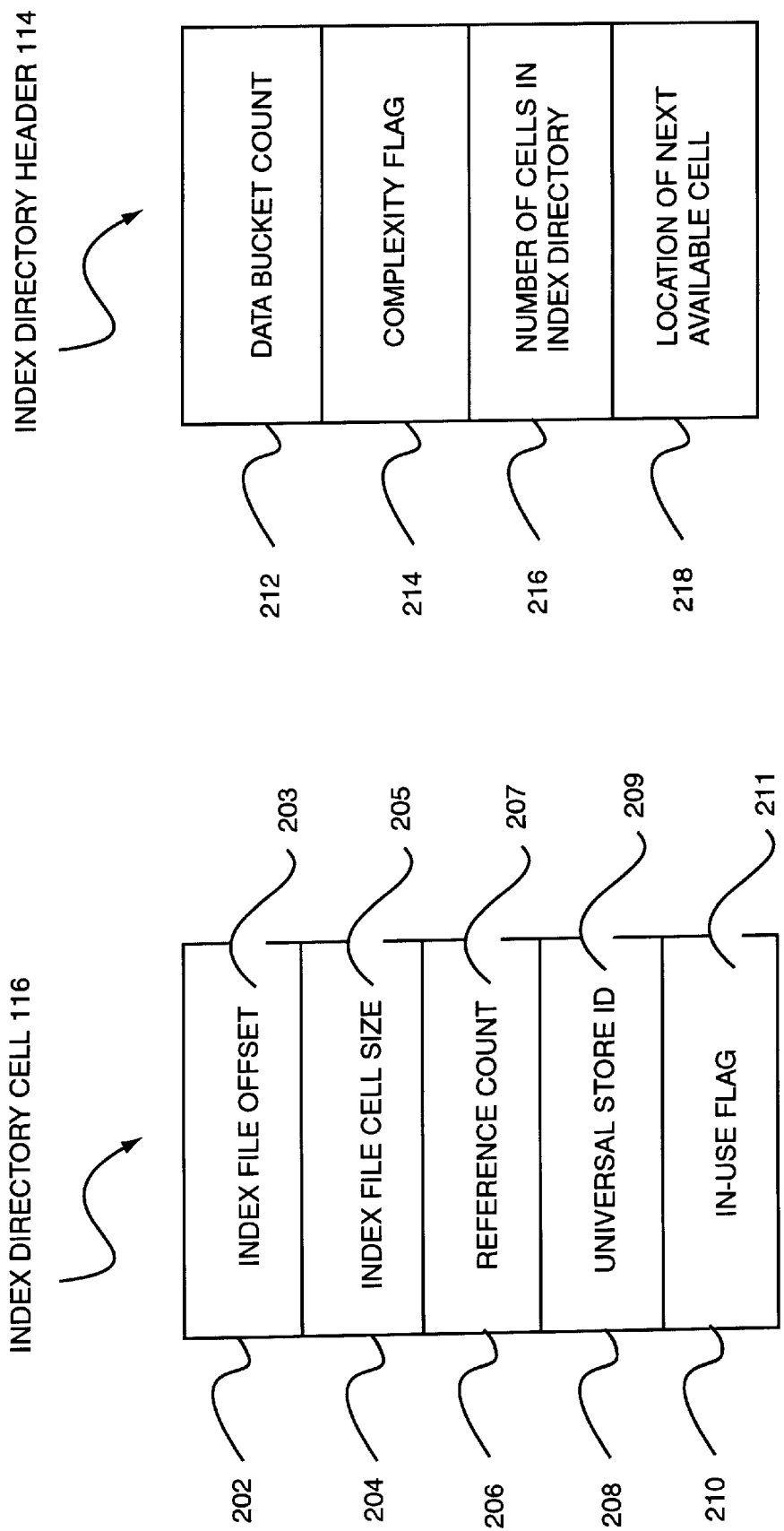

HIGH PERFORMANCE MESSAGE STORE

This application is related to U.S. patent application Ser. No. 09/067,497 filed on the same date herewith and commonly assigned, entitled "METHOD AND APPARATUS FOR HIGH PERFORMANCE ACCESS TO DATA IN A MESSAGE STORE," U.S. patent application Ser. No. 09/067,546 filed on the same date herewith and commonly assigned, entitled "METHOD AND APPARATUS FOR DETECTING INPUT DIRECTED TO A THREAD IN A MULTI-THREADED PROCESS," and U.S. application Ser. No. 09/067,567 filed on the same date herewith and commonly assigned, entitled "CRITICAL SIGNAL THREAD," which are incorporated herein by reference.

BACKGROUND OF THE INVENTION

1. Field of the Invention

The present invention relates generally to the field of computer software and client-server applications. In particular, it relates to the organization and storage of e-mail message data accessed by clients over a computer network.

2. Discussion of Related Art

The accelerated growth of network computing in the 1990s has been accompanied by an increasingly prevalent form of communication most commonly referred to as "e-mail." As more individuals, whether at home, in corporations, small businesses, academic institutions, or government organizations, have access to computers connected to some type of computer network, electronic mail is quickly becoming (and in many settings already is) a preferred mode of communication. People find e-mail an efficient and effective way to communicate whether they are sending a simple one-time message or carrying on a long-term discussion or conversation.

While e-mail has been used for years within large entities such as corporations and universities for sending messages within the entity's internal networks and is typically based on proprietary formats and protocols, the Internet is bringing e-mail out of the realm of large enterprises and into the mainstream. Because the Internet is a publicly accessible, global, computer network, it is increasingly being used for its e-mail capability. In addition, the Internet Protocol (IP) and the Internet's communication layers (TCP/IP) are being used to develop computer networks known as intranets within private entities based on IP and TCP/IP instead of proprietary formats and protocols. This approach allows, for example, a corporation or university to have an internal computer network that is compatible with the Internet and has all the features of the Internet, including Web sites, the ability to hyperlink, and, of course, send and receive e-mail.

The explosive growth of the Internet and the growing attraction of intranets has led to a proliferation of e-mail messages. Typically, e-mail messages are received and stored on network servers or on the hard drives of client and stand-alone machines. There is a growing tendency or practice and, in many cases, need, to save e-mail messages electronically and to retrieve them easily when desired. For example, this can be important in any type of research setting where messages containing ideas, comments, or analysis are sent among researchers, possibly in different countries, over a period of several years. For example, it is foreseeable that a certain message sent at a particular time two years ago between two researchers who are no longer available, has to be retrieved. Of course, this capability could also be an important and useful feature in a business environment or in other settings.

The proliferation of e-mail and the increasing number of messages being saved, coupled with the growing demand for retrieving saved messages has exposed problems with current indexing schemes and message. There is a growing trend to save messages on servers instead of on client machines. A mail server acts as a central repository of messages and has the advantages of being backed-up regularly, maintained by an administrator, and of being repaired quickly (in most cases) when broken (e.g. when it crashes). Thus, when a user makes a request, it is handled by the server and delivered to the client.

The composition of an e-mail message today can vary widely as can the type of request. In a simple case, an e-mail message can contain, in addition to required headers, a simple message portion consisting of a few lines of text. On the other hand, an e-mail can have several attachments that may include complex graphics, audio segments, video, animation, text having special encoding (e.g. if in a non-Latin based language), and even other entire e-mail messages.

Requests for messages can also vary in terms of depth and breadth of information desired. For example, a request can be for the entire content of a single message sent several years ago between two individuals. Or, a request can be for a list of recipients of any message sent regarding a particular subject in the last 24 hours, the list distinguishing those recipients who have opened the message(s) and those who have not. In sum, the nature of e-mail messages and of requests for e-mail message data have grown more complex thereby exposing weaknesses of present mail servers in handling message storage and retrieval.

Most mail servers presently used for the type of message storage and retrieval discussed above are configured according to the Internet Message Access Protocol, or IMAP. IMAP is a collection of commands for manipulating messages and indexes for sorting and storing all the information associated with messages and actions performed on them. For an IMAP-configured server to take full advantage of IMAP, information related to users on the network and messages, which includes message content and meta data regarding the message, must be stored in a manner that takes advantage of IMAP indexing. While IMAP servers store data according to IMAP indexing to some degree, none do it in such a manner that optimizes quick, reliable, and non-contentious retrieval and storage of data.

Present IMAP servers experience contention problems and other inefficiencies resulting in poor performance. Although they handle message data as a collection of fields that make up a record, i.e., they are record-based, writing a new message to a user's inbox (the mailbox in which a user receives new mail) will very likely result in locking out the user from performing other operations on the inbox. The message store of these IMAP servers were not designed to efficiently utilize the indexing available in IMAP. For example, a user may only desire information regarding certain fields (e.g. date, recipients, subjects, etc.) from all messages in a mailbox. IMAP servers are likely to retrieve more information than is needed to satisfy typical user requests for data. Thus, to simply get the number of messages sent to a particular user regarding a specific subject, an IMAP server may retrieve the entire content of all the messages to derive the number of messages. Present IMAP servers also lack strong integrity and consistency checking capabilities possible in IMAP.

Others mail server implementations require that an entire message be delivered or copied regardless of what type of information regarding the message is being requested. This problem is similar to VARMAIL, an older file-based mail environment in the UNIX operating system, in which delivery of a message locked out all write operations to a mail folder. This default procedure caused the mail delivery system to be considerably slow. In addition, the VARMAIL environment also required multiple copies of the same e-mail message to be stored in the client machine's memory.

Therefore, what is needed is a server-based message store partitioned such that indexes, message data, and user data are logically arranged to improve message storage and retrieval times, and maintain strong data integrity. The message store should reduce contention and allow users and the server to perform read and write operations on messages and mail folders concurrently. It would also be desirable to increase the level of specificity recognizable by the server when handling users' requests for data so that the server only retrieves data that was requested with reduced extraneous data thereby increasing retrieval speed and saving memory.

SUMMARY OF THE INVENTION

To achieve the foregoing, and in accordance with the purpose of the present invention, a method, apparatus, and computer readable medium for creating an efficient message store and delivery system are provided. In accordance with one aspect of the present invention, a message store having an index directory, index file, and data bucket area, all of which are page based, is described. Each page corresponds to a period of time, such as a day in one embodiment. Each data bucket contains message data and the actual content of the message. The index file contains index file cells which store index information characterizing an associated message. The index directory contains index directory cells which store information on the location of an associated index file cell, and is thereby associated with a message.

In one embodiment, the message store also includes page based user folders each having user cells which reference a message, associated with a user, in the user store. In another embodiment, each user cell contains a reference to an index directory cell in the index directory. In yet another embodiment, each user folder is categorized according to a predetermined user based criteria.

In another embodiment of the present invention, an index directory cell includes the number of users that are currently referencing an associated message and a reference pointer to an associated index file cell. In yet another embodiment, the index file cell includes a reference pointer to an associated message in a data bucket and the size of the associated message.

In yet another embodiment of the present invention, a message includes a reference pointer to an associated index file cell and a reference pointer to an associated index directory cell. In yet another embodiment of the present invention, the index directory pointer in the user cell, the index file pointer in the index directory cell, the message pointer in the index file cell, and the two pointers in the message allow the message store to reconstruct itself if necessary.

In another aspect of the invention, a method of efficiently delivering new messages to the message store is provided. In one embodiment incoming data and related index data are appended to particular portions of a message store at substantially the same time. While the incoming data and the index data are being written to the message store, a client can access substantially unhindered existing data in the message store. In yet another embodiment, access is restricted to an unused portion of the message store where the incoming data is being appended.

BRIEF DESCRIPTION OF THE DRAWINGS

The invention, together with further advantages thereof, may best be understood by reference of the following description taken in conjunction with the accompanying drawings in which:

FIG. 1a is a block diagram showing a message store in accordance with one embodiment of the present invention.

FIG. 1c is a block diagram showing a user store area of a message storage in accordance with one embodiment of the present invention.

FIG. 2a is an illustration of a data structure showing fields in an index directory cell as shown in FIG. 1b.

FIG. 2b is an illustration of a data structure showing fields in an index directory header as shown in FIG. 1b.

DETAILED DESCRIPTION OF THE PREFERRED EMBODIMENTS

Figure 1B:
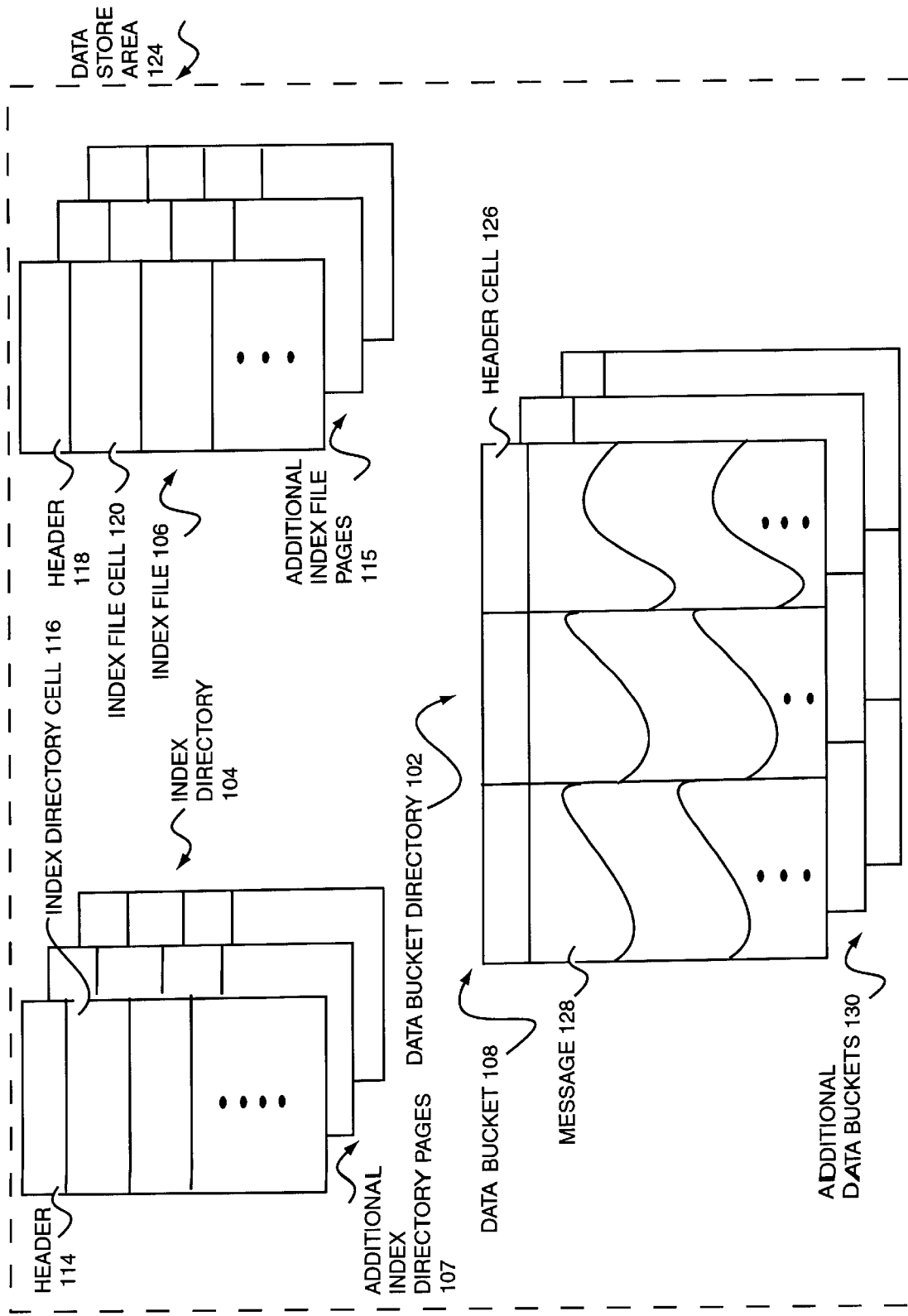
FIG. 1b is a block diagram showing a data store area of a message store in accordance with one embodiment of the present invention.

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

An improved message store for storing data, such as e-mail messages, related information, and user information is illustrated in the various drawings. In the described embodiment, the improved message store is configured to store mail messages, for example Internet e-mail messages, but can be used to store other types of information. With regard to the described embodiment, it is desirable to store and index mail messages on a server where the server is responsive to client (i.e. user) requests for data regarding that client's messages. In accordance with the described embodiment, the message store can be configured to respond to commands and messages of most commonly used mail protocols. It will be appreciated that two such protocols are the Internet Message Access Protocol (IMAP) and the Post Office Protocol (POP). For the purposes of illustrating and describing the present invention in accordance with the described embodiment, the server containing the message store is configured to primarily respond to IMAP and POP commands and messages (referred to generally as IMAP servers). With regard to the described embodiment, it should be noted that while IMAP servers presently have some degree of indexing, the overall configuration of the IMAP message store and level of indexing is unable to efficiently process increasingly complicated and demanding user requests for data.

Thus, the underlying page-based configuration and high level of indexing of the message store of the present invention allows the server of the described embodiment to process incoming messages and handle user requests (to manipulate existing data) in a highly efficient manner. The underlying page-based configuration of the message store allows data to be categorized based on a pre-defined criteria, such as a time-period, e.g., a day or a week, thereby eliminating the need to search through or process an entire body of data, most of which would be superfluous. The high granularity of indexing of the message store and the various storage components, such as the index directory and file, discussed in detail below, also allow the system to ensure data integrity by using references (to other storage components) and counters which facilitate consistency checks and reduces data redundancy. In addition, user requests and incoming messages are handled on a record basis, where a record is essentially a combination of fields in the various storage components in the message store, discussed in detail below. Because typically only certain fields are needed in responding to a user request or to process an incoming message, the server is able to perform section locking instead of locking entire folders or directories. This greatly reduces contention between writing to the server (e.g. processing an incoming message) and handling a user request that requires access to the same mailbox.

A message store in accordance with one embodiment of the present invention is suitable for storing data in servers used in large-scale distributed computer environment (i.e. tens of thousands of users) or in much smaller computer networks having, for example, less than ten users. The advantages of the improved message store are realized in both contexts, and in contexts in between. By way of example, the server in the described embodiment is an IMAP server that stores Internet e-mail for users in a large-scale distributed computing environment. Accordingly, it is useful to briefly explain the structure of an Internet e-mail message used in this example. As is well-known to a person of ordinary skill in the art, an Internet e-mail message is formatted according to the MIME standard. A MIME message consists of a MIME header and one or more body parts or sections, each body part having a header. The MIME format allows an e-mail message to contain various types of media such as audio, video images, non-English text, HTML, and so on. A message store of the described embodiment accommodates MIME sections through various indexes which are discussed below. In other preferred embodiments, the described index structure can be used to accommodate other data formats. A message store in accordance with the described embodiment allows for retrieval of specific MIME sections of a specific message without retrieving the entire message, in addition to efficiently handling other highly specific requests.

FIG. 1a is a block diagram showing a message store in accordance with one embodiment of the present invention. The message store 100 includes a data bucket directory 102, an index directory 104, an index file 106, and a user folder directory 110. The data bucket directory 102 includes a series of data buckets 112. The index directory 104 includes a header 114 and a series of index directory cells 116. The index file 106 includes a header 118 and a series of index file cells 120. The user folder directory 110 includes a series of user folders 122.

Message store 100 can be divided into two storage categories: a data store and a user store. FIG 1b is a block diagram showing storage components of a data store area in accordance with one embodiment of the present invention. A data store area 124 shown in FIG. 1b includes index directory 104, index file 106, and data bucket directory 102. Each of these storage components are structured according to a page-based configuration. Each page can correspond to a pre-defined criteria, such as a particular time period. For example, in the described embodiment, each page of the storage components are day-based, where each storage component is organized at the top level based on the day a particular message was received. In other preferred embodiments, each page can correspond to a week or an eight-hour period depending on the volume of data traffic on the system. Data bucket directory 102 is made up of data buckets 108. A typical data bucket 108 is shown with a header 126 and a representative message area 128. Data bucket directory 102, or data bucket holder, is essentially a container for holding a series of data buckets for a previously defined time period, such as a day. Thus, in the described embodiment, generally all messages received in a given day are stored in a data bucket corresponding to that particular day.

In the described embodiment, the data bucket directory 102 initially contains or holds three data buckets. The buckets are essentially identical in structure to data bucket 108. One or more additional data buckets 130 are added to the data bucket directory 102 if any one of the initial three data buckets exceeds a configurable disk file size. In other preferred embodiments, the manner in which additional data buckets are added can vary. For example, the message store can initially have just one data bucket, and add one additional data bucket when any one of the initial buckets is filled. Returning to the described embodiment, incoming messages for a particular day are distributed randomly among the first three data buckets with the intention of having a substantially even distribution among the three data buckets. This distribution of messages is continued or maintained as additional data buckets are added to the data bucket directory 102. In the described embodiment, when the initial three data buckets are full, an additional three data buckets are added and the messages are randomly distributed among the new data buckets. As mentioned above, a message store of the present invention can be used in large-scale, high-volume, computer environments or much smaller computer networks. By way of example, in a large distributed computing environment, as in the described embodiment, a typical data bucket holder can have a maximum disk file size of 500 megabytes.

Data bucket 108 typically begins with a header cell 126. Following header 126 is data, stored sequentially, such as e-mail messages 128 in bucket 108. In other preferred embodiments, the data can be video or audio segments, database records, or other forms of data. In the described embodiment, the messages are added to a particular data bucket and are not contained in a cell or fixed storage area.

Although the size of a message can vary widely, a typical e-mail message is in the range of two to ten kilobytes. As mentioned above, in the described embodiment, the incoming messages are stored randomly and preferably among the first three data buckets for a particular day. As the data buckets get full new data buckets 130 are created to store the messages. Thus, an incoming message addressed to a plurality of recipients is stored once in a data bucket. Features of the message store of the present invention allow a message's recipients (or owners, creators, etc.) to all have references to a single copy of the message. This feature is discussed in greater detail below. In the described embodiment, a typical data bucket can hold about 200,000 two and one-half kilobyte messages. Thus, three data buckets (i.e. the initial number of data buckets assigned for a particular day) can hold up to or around 600,000 e-mail messages. Of course, many of those messages can be well over two and one-half kilobytes depending on the type of message and attachments. When a message is received, in addition to being stored in a data bucket, it is also analyzed by an indexing thread so that index and related information can be stored in index directory 104 and index file 106. This information is stored in a particular page of the directory 104 and file 106. In the described embodiment, the index directory and index files are day-based in that each day is assigned a new directory and file. Additional index directory pages 107 are shown "behind" index directory page 104. Index directory 104 begins with a header 114 followed by index directory cells. An sample cell is shown at area 116. When an incoming message is received it is analyzed and the index information is derived and stored in an index directory cell 116. By way of example, in the described embodiment the index directory cell 116 has a fixed record size of 24 bytes. In other preferred embodiments, the index directory cell 116 can be larger or smaller depending on the type of data being stored and the level of indexing required.

When an incoming message is analyzed, indexing information regarding that message is stored in the index file 106. As with the index directory and the data bucket directory, in the described embodiment one page of the index file corresponds to a particular day. Similarly, index file pages 115 for day two and day three are shown "behind" index file 106. These pages 115 can correspond to other previously defined time periods or other criteria. Index file 106 begins with an index file header 118 followed by index file cells such as cell 120. As will be discussed in greater detail below, the index file itself contains detailed indexing information regarding each incoming message and includes several different fields. In the described embodiment, the index file header 118 is of a fixed record size.

FIG. 1c is a block diagram showing a user store area of a message store in accordance with one embodiment of the present invention. As mentioned above, a message store can be conceptually divided into a data store area and a user store area. This distinction is not required for the functionality of the message store as shown in FIG. 1a. The distinction is being used in the described embodiment to illustrate the message data aspect and the user data aspect of the message store.

Depending on the size of the network being serviced by the message store, and in particular, the number of users, a typical user store area 132 can contain several thousand user folder directories similar to directory 134. In other scenarios, user store area 132 may contain only a few user folder directories, or one directory if there are only a few users accessing the message store. User folder directory 134 is essentially a collection of user folders 136 for a group of users. Generally, a user always has at least one user mail folder for receiving new mail called the inbox. In the e-mail context, users can create customized folders for holding messages on a particular subject or a user-chosen criteria. A user folder 136 begins with a header 138 followed by user folder cells 140. In the described embodiment, typical user folder cell 140 contains indexing and other information regarding a message but does not contain the actual data or contents of the message. The actual content of a particular message is stored in the data bucket directory 102 of FIG. 1b. This allows the message store to have a message addressed to several users on the network be stored or written to the message store only once, by having references to the particular user folders. In other preferred embodiments, the data may be other types of data which needs to be referenced by several users on the network. Other folders contained in user folder directory 134 are administrative folders and folders to hold, for example, IMAP information. In the described embodiment, each user folder directory 134 is given an identifier, typically a integer. A user's last name, for example, can be hashed to that particular integer. This allows for a substantially uniform distribution of user names in each user folder directory 134.

Data bucket directory 102, index directory 104, index file 106, and user folder (data space) directory 134 are logically connected to ensure that the message store is consistent and, in case of an error, can easily be repaired. A series of references form paths among the storage components which will be described in greater detail below with reference to particular fields and values in those fields in the index directory cell 116, index file cell 120, a user folder cell 138, and data bucket 108. When a message is received, an indexing thread examines the structure and contents of the message. A digest of the header of the received message is parsed and contained in index file cell 120. Similarly, the body structure of the message is analyzed and the body information is stored in index file cell 120 corresponding to that message. In the described embodiment, if a particular message is longer than a predetermined length, the message is analyzed on at connect time so that it does not create a bottleneck on the server during delivery, thereby slowing down overall performance. By pre-analyzing the structure of the message a client, using a message store in accordance with one embodiment of the present invention, can, for example, obtain in one read all the header data for a particular message from the data bucket where the message is stored. As is described in greater detail below, index file cell 116 has sufficient meta data such as envelope information, and body structure information, so that users can obtain the properties required from a particular message with one read operation without having to access the entire message.

FIG. 2a is a data structure diagram showing fields in an index directory cell 116 in accordance with one embodiment of the present invention. The information in index directory cell 116 is essentially meta data on information stored in the index file cell 120. Thus, for the system to access data contained in index file cell 120 it first accesses the index directory cell 116 for a reference to the appropriate location in the index file 106. The index directory cell 116 contains values for an index file offset 203, an index file cell size 205, a reference count 207, a universal store identifier 209, and an in-use flag 211. An index file offset field 202 in the index directory cell 120 provides an index file offset value 203 which is the location within the index file 106 at which point the appropriate index file cell 120 begins. Index file cell size field 204 provides the cell size 205 of the index file cell that begins at the offset 203 indicated in index file offset field 202. With this information the system can access the appropriate index file cell 120 in the index file 106. Reference count field 206 contains a reference count 207 of the number of user folders 136 that refer to a message or other data (associated with the particular index directory cell). Reference count 207 is the number of users who have access to a particular message. Universal store identifier field 208 stores a universal store identification 209 which ensures unique identification of each message or item of data. Thus, in the described embodiment, there is exactly one universal store identifier 209 for a particular message and that identifier cannot be used to identify any other message in the system. An in-use flag field 210 contains an in-use flag 211 which indicates whether data is still in the message store. The message store can contain a particular message even if there are no references to it, i.e., the reference count 207 for that message is zero. The message stays in the store until it is expunged or garbage collection is performed. This is useful in retrieving the message in the event another user wants to access that particular message. The system simply increases the reference count 207 to one, and the message can be viewed by a particular user.

FIG. 2b is a data structure diagram showing fields in an index directory header 114 as shown in FIG. 1b, in accordance with one embodiment of the present invention. A data bucket count field 212 contains a data bucket count of data buckets 108 being used in a particular day, and is used primarily for consistency checks. A complexity flag field 214 contains a flag indicating whether the system is indexing the message data. Index directory cell count field 216 contains the number of index directory cells 116 that are presently in the index directory 104. A next available cell field 218 contains the location of a next available index directory cell. While in the described embodiment the fields described above are listed in a certain order, in other preferred embodiments the fields may be ordered differently depending on a specific implementation of the message store. In addition, in other preferred embodiments, certain fields may not be needed or may contain no values. Again, which fields are used depend in part on a specific implementation of the message store.

Figure 3:
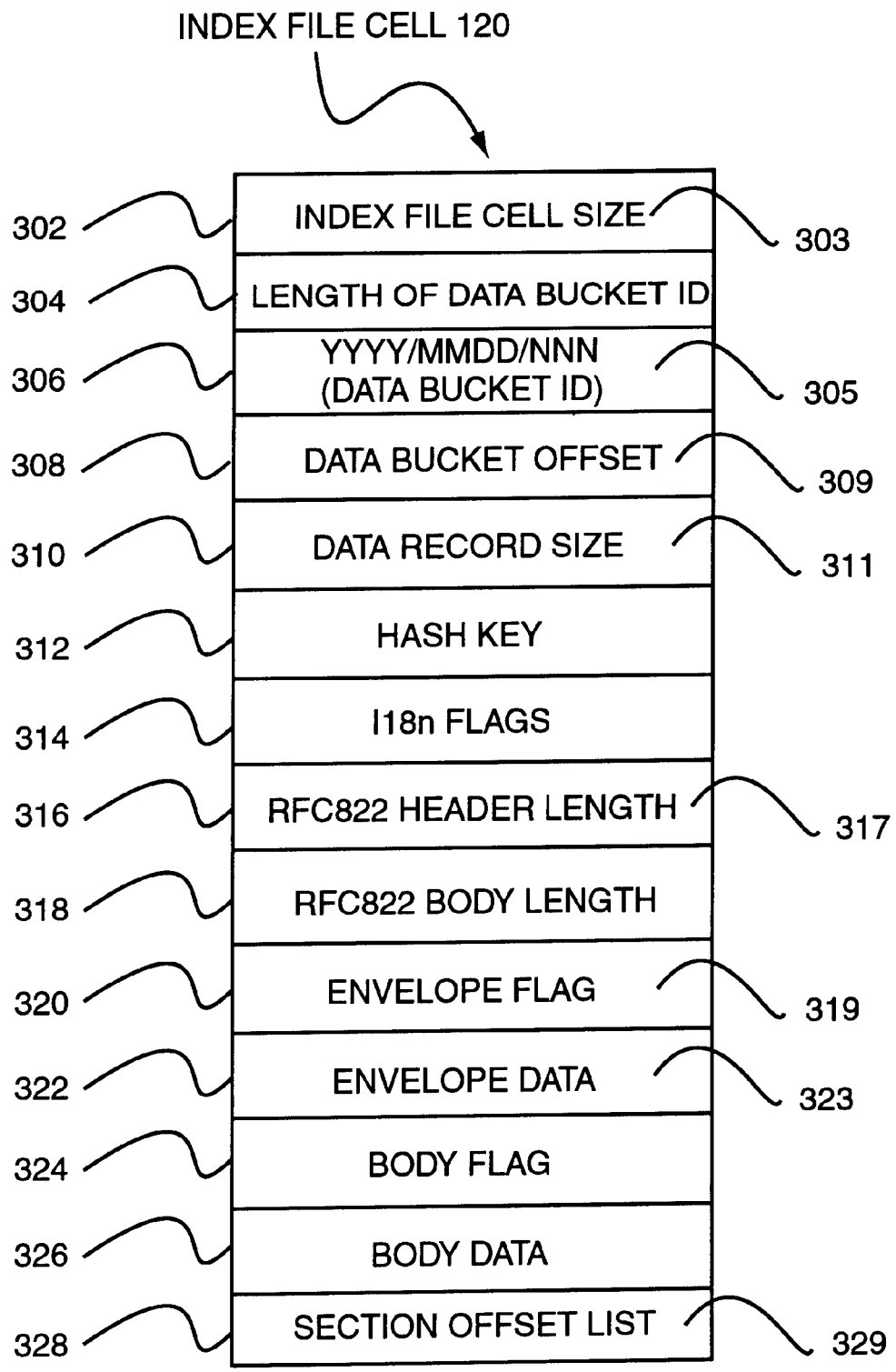
FIG. 3 is an illustration of a data structure showing fields within an index file cell in greater detail.

FIG. 3 is a data structure diagram showing fields in an index file cell 120 in accordance with one embodiment in greater detail. An index file cell size 302 contains an index file record size 303 which provides the size of the index file cell and is used for internal consistency checks. Using this value the system can jump from one record to another and ensure integrity by checking to see whether a new index file cell begins and ends at expected locations on the disk file. Identification length field 304 and data bucket identification field 306 are related in that field 304 contains the number of bytes or length of the field 306. Data bucket identification field 306 contains a data bucket identifier 305 and, in the described embodiment, consists of four digits for the year, two digits for the month, two digits for the day, and a three-digit integer. These digits make up a unique identifier for the data bucket 108 that contains the message corresponding to a particular index file cell. Identification length field 304 is simply used to ensure consistency of the data bucket identifier by ensuring that it is the proper length. Data bucket offset field 308 contains the offset 309 in the data bucket that contains the message that is associated with a particular index file cell. It essentially provides the location in the data bucket where the message is located. Data record size field 310 contains the size of the data 311 in the data bucket and is made up of the size of the message plus the size of any preamble data. Thus, with fields 308 and 310, the system can go directly to the location in a particular data bucket and retrieve the entire data record (i.e. the message) associated with the index file cell in a single read.

A hash key field 312 contains a hash key associated with a hash table used to inform the system whether a particular message is already in the message store. Thus, a particular message is hashed, and if it is determined that the hash value is in the hash table, the system knows that the message is already in the message store, thereby reducing redundancy. An I18n flags field 314 contains I18n flags. These flags indicate whether the message has 16-bit language encoding or other special encoding. If so, special requirements for searching are needed. An RFC822 header length field 316 and a RFC822 body length field 318 are related in that they both contain values that refer to an Internet mail header referred to as the RFC822 header. RFC822 is an Internet mail header format required for all Internet mail. It contains fields such as recipient, sender, subject, and date. Header length field 316 contains the RFC822 header length and field body length 318 contains the RFC822 body length. The sum of the RFC822 header length 317 and the RFC822 body length is the length of the entire message including attachments, headers and all MIME body part(s). In the described embodiment, fields 302 through 318 are present in every message and, thus, collectively define a default preamble of the index file cell. In other preferred embodiments, depending on the type of data being stored, not all these may be needed. For example, the RFC822 header and body length fields would not be needed if Internet mail message were not being stored. The index file cell 120 is of variable length in the described embodiment because IMAP allows the addition of other fields and indexes.

Fields 320 through 328 are part of the data portion of the index file 106 of the index file cell. In the described embodiment, the store parsing level for IMAP is two and for POP is zero. Envelope flag field 320 contains an envelope flag value 319 and indicates whether the system analyzed the message data. In the described embodiment, if the message is in IMAP, the envelope flag is one, and if it is in POP the envelope flag is zero. Thus, by using the envelope flag 319, the system does not waste time attempting to analyze the POP message. An envelope data field 322 contains all the envelope information 323 such as size and other data if the message is analyzed (as with IMAP messages). A body flag field 324 contains a body flag and has the same purpose as value 319. Similarly, a body data field 326 contains body size and other body structure information if the parsing level is IMAP. Offset list field 328 contains a section offset list which provides a quick way for the system to find MIME body parts (or sections) in a particular message in the data bucket. The section offset list 329 provides offsets and lengths of each MIME body part in a MIME message so that a particular body part can be located with one disk data access. In other preferred embodiments these fields may be given other names more descriptive of the particular application for which the message store is being used. In addition, the index file cell 120 may have more or fewer fields depending on the type of data being stored.

Figure 4:
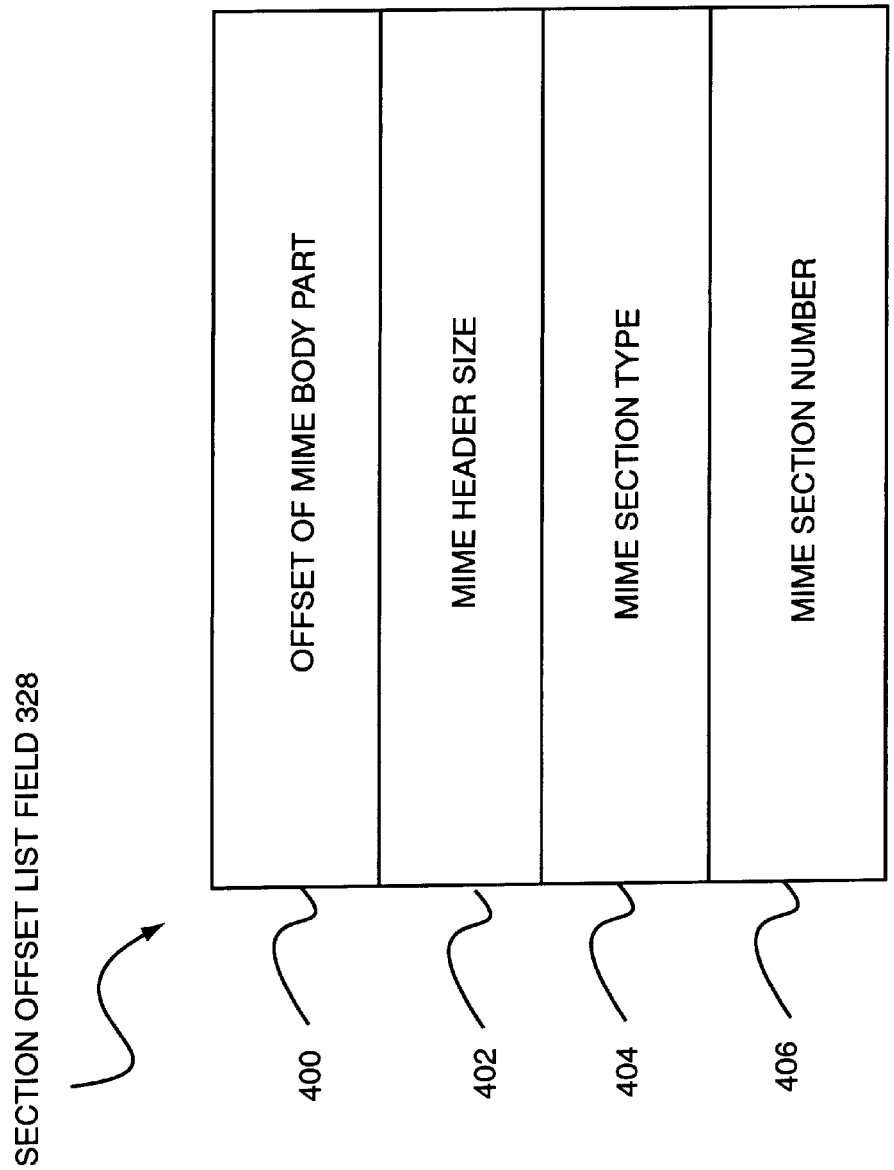
FIG. 4 is an illustration of a data structure showing a section offset list of the present invention in greater detail.

FIG. 4 is a data structure diagram showing in greater detail the section offset list field 328 of FIG. 3. In other preferred embodiments, section offset list 328 may contain more specific information on other types of data or may not be utilized at all, depending on the type of data stored. Body part field 400 contains the offset of the MIME body part from the start of the message as stored in the data bucket. This allows the system to obtain a MIME section within a message by only having to access the index file cell 120. A header size field 402 contains a MIME header size. Each MIME body part has a MIME header which contains information such the content, type, body encoding and other information such as public key information. A section type field 404 contains the MIME section type, such as text, image, or audio. This information is useful in searching the MIME body part. A section number field 406 contains a MIME section number which allows the system to get the body part number directly from the index file cell. In the described embodiment, this is significant given that a MIME messages can have several body parts, of which one can be other MIME body parts. If a particular MIME section number cannot be found, the system without having to access the message in the data bucket informs the user that such section number does not exist. All values 329 in section offset list field 328 described above can be utilized to provide a greater amount of information in significantly less time than was previously attainable. Section offset list field 328 can be used in other preferred embodiments to achieve similar advantages.

Figure 5:
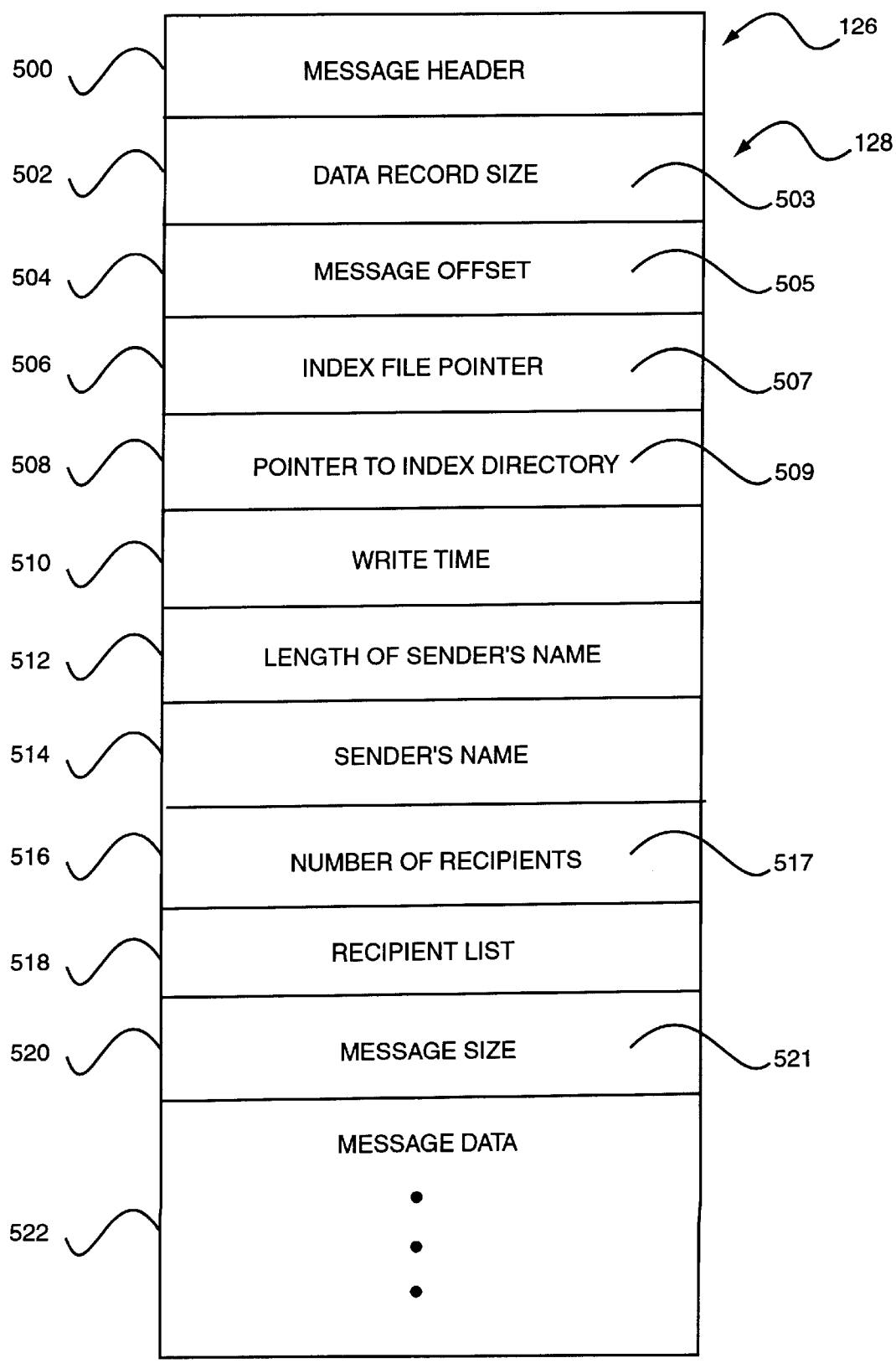
FIG. 5 is an illustration of a data structure showing a header and message in a data bucket directory as shown in FIG. 1b in greater detail.

FIG. 5 is a data structure diagram showing in greater detail header cell 126 and message 128 in data bucket 108 in accordance with one embodiment of the present invention. A header field 500 contains a message header for a particular data bucket 108 that precedes message 128. It contains an end-of-file pointer, which indicates the number of records in data bucket 108. The pointer, referred to in the described embodiment as the magic number, ensures integrity of the data bucket 108. Data record size field 502 contains the data record size 503 which is the size preamble information plus the actual message. Thus, the actual message data size is typically less than the total data record size as contained in data record size 502. This value allows the system to rapidly skip from one data record to the next and check for data record integrity. A message offset field 504 contains an offset length 505 to the location where the message data or the actual data within a particular message begins in the data bucket. In the described embodiment, it is a pointer to the beginning of message data contained in message data field 522 discussed below. An index file pointer field 506 contains an index file pointer 507 which has a format identical to value 305 in data bucket identifier field 306 of FIG. 3. The format is similar to the format of value 305: a four digit year, followed by two digits each for the month and day, followed by a three digit integer. An index file pointer field 506 contains an index file pointer 507 used for consistency check and in the event the system needs to reconstruct the store from the data alone. The system can reconstruct the message store by essentially backtracking to information in the index directory, index file, and the user files.

An index directory pointer field 508 contains a pointer 509 to the index directory 104 and specifically to an index directory cell 116. In the described embodiment, the pointer is in the form of an integer used to locate a particular cell in the index directory. Since the size of the index directory cell is of fixed value 509, it is multiplied by the size of the cell to determine the beginning location of the particular directory cell corresponding to a message or data. This value is also used to ensure that the closed loop formed from pointers in the storage components in the message store is not broken. A write time field 510 contains the time the message was written to the message store and is used to maintain consistent time, for example, in the event the message is exported to another system. In the described embodiment, time is measured beginning from Jan. 1, 1970. A length field 512 and sender's name field 514 refer to a sender of the message in which field 512 contains the length of the sender's name and field 514 contains the full sender's name. A recipient count field 516 stores the number of message recipients 517, or in other preferred embodiments, contains the number of owners or creators of a particular piece of data. A recipient list field 518 contains a list of recipient (or owners, creators, etc.) names. A message size field 520 contains the size 521 of the actual message (as opposed to the data record size 503 in field 502). The message size 521 is the size of the actual data, which may include attachments, and is measured from the header to the last byte of data in the message.

In the described embodiment, fields 500 through 520 make up a preamble to a particular message and can be used to ensure the message store is consistent and not "broken" in any respect. A message data field 522 contains the actual message data that was sent from a sender data structure as contained in sender's name field 514.

Figure 6:
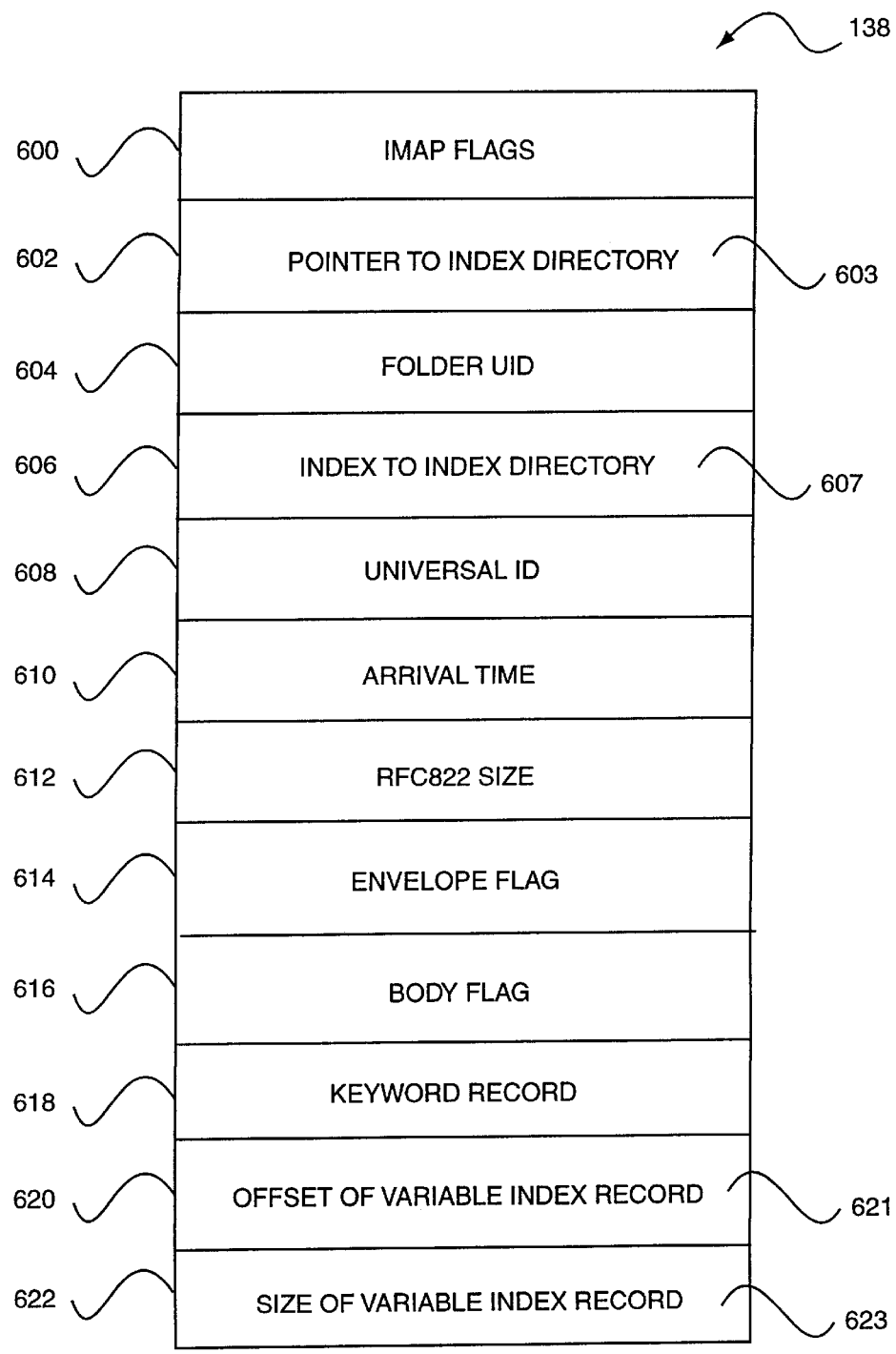
FIG. 6 is an illustration of a data structure showing a message cell within a user folder of FIG. 1c in greater detail.

FIG. 6 is a data structure diagram showing in greater detail a user folder cell 138 in a user folder 136 of FIG. 1c in accordance with one embodiment of the present invention. A series of user folders in which each user may have one or more folders is contained within user folder directory 134. A flags field 600 contains, in the described embodiment, IMAP flags indicating various states of a message. In the described embodiment these include delete, read, answer, flag and draft. In other preferred embodiments, this field can contain flags indicating states of other types of data stored in the message store. An index directory pointer field 602 contains a pointer 603 to the index directory 104. In the described embodiment it includes four digits for the year, followed by two digits each for the month and day. Value 603 is used as a pointer to the appropriate cell 116 in the index directory 104. A folder identifier field 604 contains a universal folder identification which is used only once in the lifetime of the folder. This folder identification assists in keeping messages synchronized. When the folder is shrunk to zero, identification for the next message is assigned a starting value such as one or zero and is then incremented with each incoming message. An index field 606 contains an index 607 to the appropriate location in the index directory 104 and is similar to value 509 of FIG. 5. In the described embodiment, it is an integer that indicates a reference point in the index directory 104. This integer is used in conjunction with a fixed index directory cell size to determine the appropriate location of the cell 116 in the index directory 104.

A universal identifier field 608 contains a universal identification number for the particular message and is used for back-up and restore of the data if necessary. An arrival time field 610 contains the time the message is received and can be used for chronological ordering of data in the message store. A RFC822 size field 612 is the RFC822 message size and is used primarily by IMAP and POP in the described embodiment. POP uses it because it is the real size of the message in bytes as it would appear on the network It is the same as the value in field 318 of FIG. 300. In other preferred embodiments in which the message store does not contain Internet e-mail messages, this field and others described can have a different name and contain a value specific to another implementation of the message store, or it may not be needed at all. An envelope flag field 614 contains an envelope flag indicating whether an envelope for a message is present in the message store. If the envelope has been indexed in the index directory 104 then the system does not need to create a local index for that particular message envelope. If the envelope has not been indexed and is not in the index directory, the system performs a local index analysis. Similarly, a body flag field 616 indicates whether a body is present, and whether it has been indexed and is in the index directory. In this event the system does not have to perform a local index analysis. A key word record field 618 contains a keyword record which lists keywords a user assigns to a particular message. In the described embodiment, keyword is a user-assigned flag associated with a message. An offset field 620 and a size field 622 contain an offset 621 and size 623, respectively. They are used, in the described embodiment, if the message was indexed at first access time (i.e., envelope flag and body flags are zero indicating that the envelope and body are not present) or if the header is larger than 64 kilobytes. If a message is indexed locally because of its size, a record is created in a VAR folder in the user's inbox. The VAR folder contains a particular index record, created when a message is indexed locally. In order to locate this index record in the VAR folder, the system uses the offset 621 for the index record (i.e. distance to the beginning of the record from the beginning of the folder), and the size 623 of the index record provided in field 622. This optional indexing feature eliminates delays on the server due to indexing unusually large messages. The index data is still stored on the server in the appropriate data and user store cells.

Figure 7:
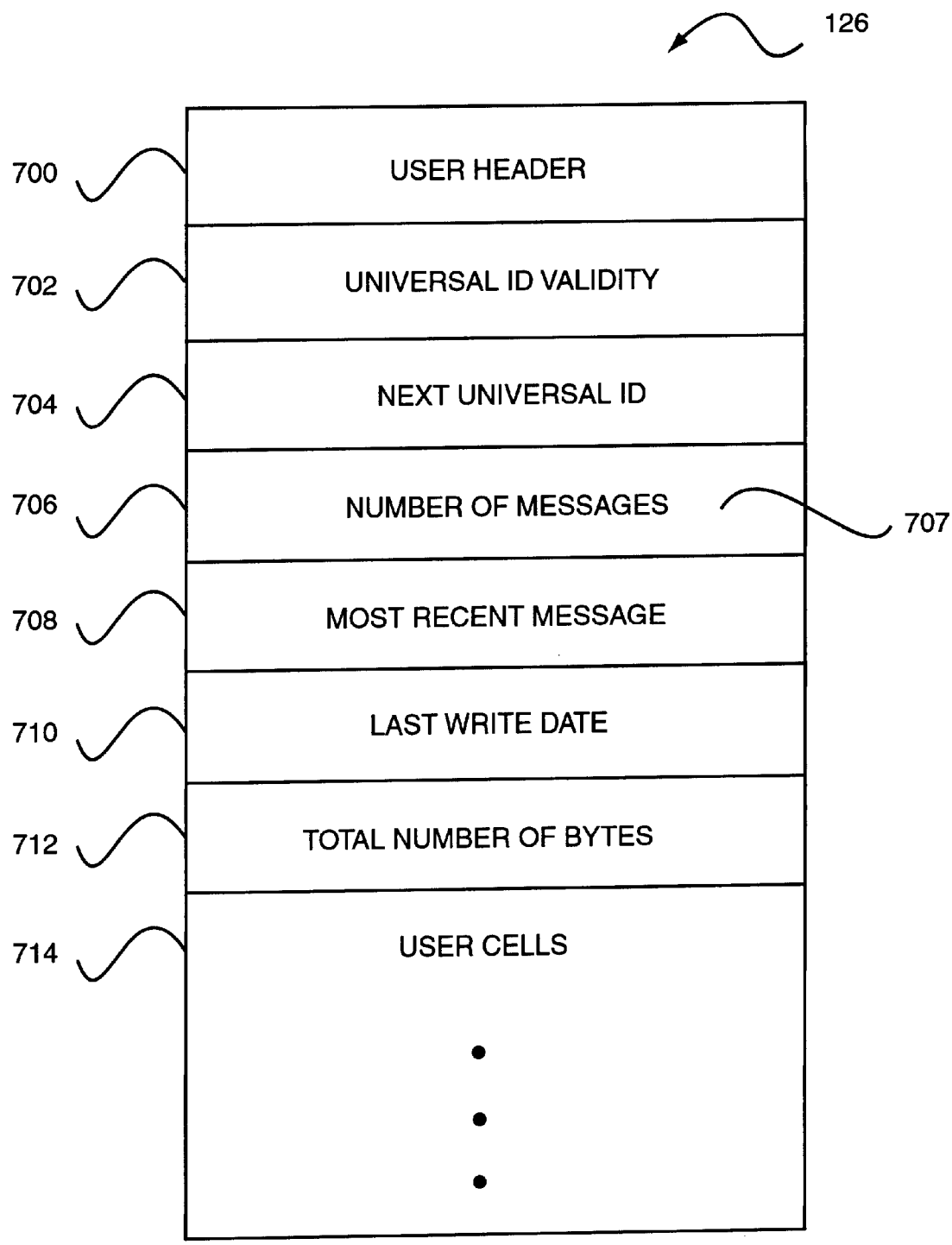
FIG. 7 is an illustration of a data structure showing a user folder of FIG. 1c in greater detail.

FIG. 7 is a data structure diagram showing in greater detail user folder 136 in accordance with one embodiment of the present invention. A typical example of a user folder is the inbox for holding new messages. Users can create other customized folders to hold mail on various subjects or topics. A user header field 700 contains the user header for the particular folder. A validity field 702 contains a universal identification (UID) validity indicator used by IMAP. When a UID is changed it becomes invalid. This occurs when UIDs are renumbered, for example, and is a condition useful for IMAP to know. As with this field and other fields, in other preferred embodiments, this field can be used to store other flags or indicators useful in other implementations. A next indicator field 704 contains the next UID to be assigned to the next incoming message or to a newly created folder. A message count field 706 contains the number of messages 707 or data items in that particular folder. A most recent message field 708 contains the last message viewed by a user. This value changes when new mail arrives and the user looks at its contents. A write date field 710 contains the last write date referred to in the described embodiment as the magic number. It is the last date and time the user performed a write operation on the particular folder. One use of the magic number is for cache re-synchronization. If the magic number has not changed since it was last checked, the system does not have to perform a cache re-synchronization for that particular folder because there has no activity in that mail box. A size field 712 contains the total number of real bytes stored in the message store from this particular folder. It contains a total number of real bytes of data, which is useful for quotas regarding memory imposed on users. Following field 712 is user cell area 714 containing the user cells as described in FIG. 6.

Figure 8:
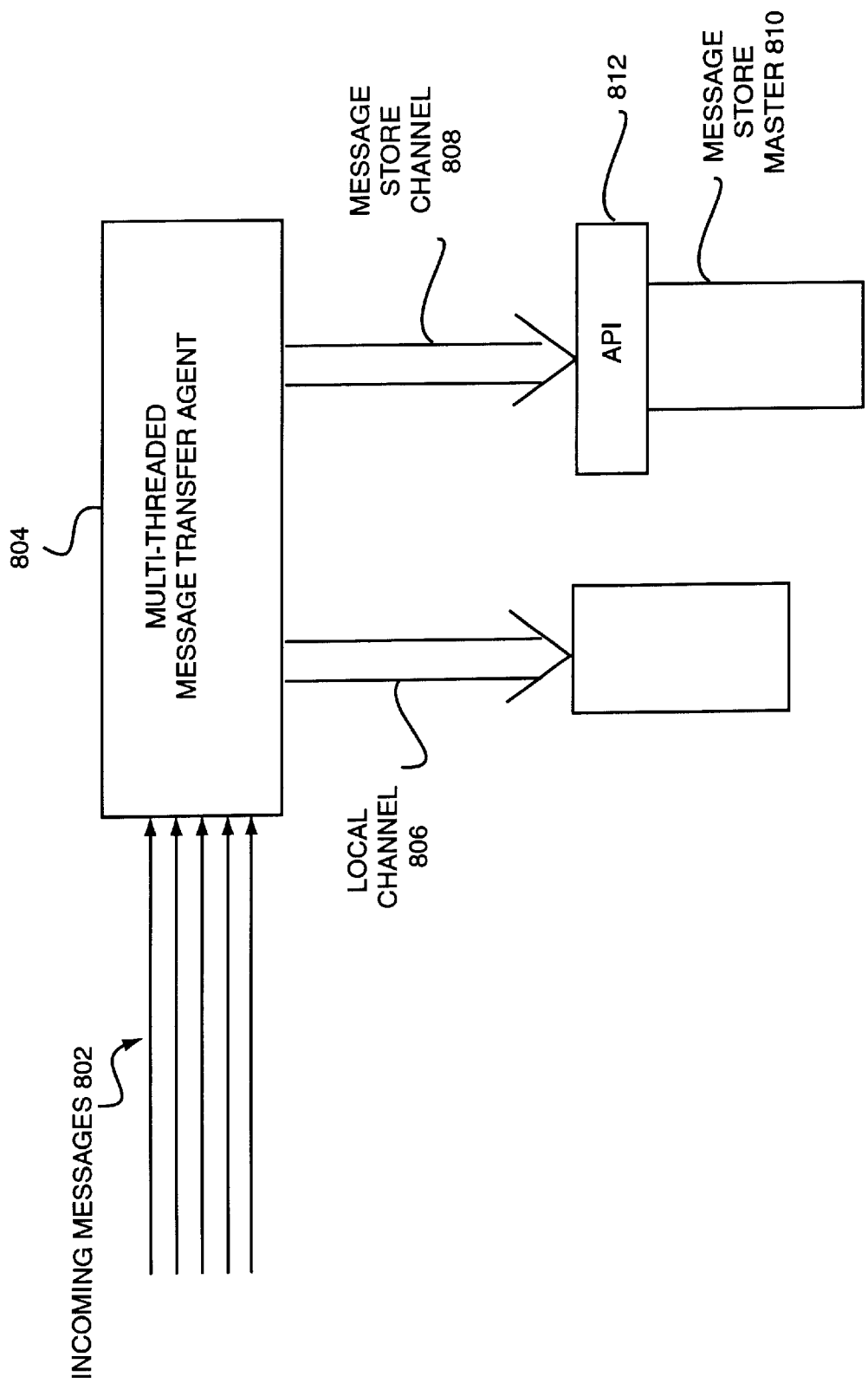
FIG. 8 is an illustration of a data structure showing components involved in receiving an e-mail message to delivering the message to a message store of the present invention.

FIG. 8 is a block diagram showing components for receiving an e-mail message and delivering the message to a message store in accordance with the described embodiment. Messages 802 are received by a mail transfer agent (MTA) 804 which may be multi-threaded through an SMTP (Simple Mail Transfer Protocol) port. In the described embodiment, the messages 802 are sent to either a local channel 806 or to a message store channel 808 depending on the client receiving the mail. The message store channel is a list of files, each file corresponding to a message. When a message enters the message store channel, it is filed sequentially. The local channel is structured similarly and is known to a person of ordinary skill in the art. A message store master 810 reads messages 802 from the message store channel 808. If the message store master 810 is not running, it begins running once it reads the first message in channel 808. In a large multi-threaded system, the message store master 810 can read up to 10 messages at a time. It reads the messages 802 through an API (application programming interface) 812 which enables it to read messages 802 from the message store channel 808. The message store master 810 delivers the messages 802 to the message store 100. As mentioned above, the described embodiment illustrates use of the message store of the present invention for storing e-mail messages. The message store can be used for storing other types of data which can have delivery systems other than the one described in FIG. 8 and FIG. 9, described below. In other preferred embodiments, the data may be placed in the message store directly by a user or by another application, such as a browser or word processor.

Figure 9:
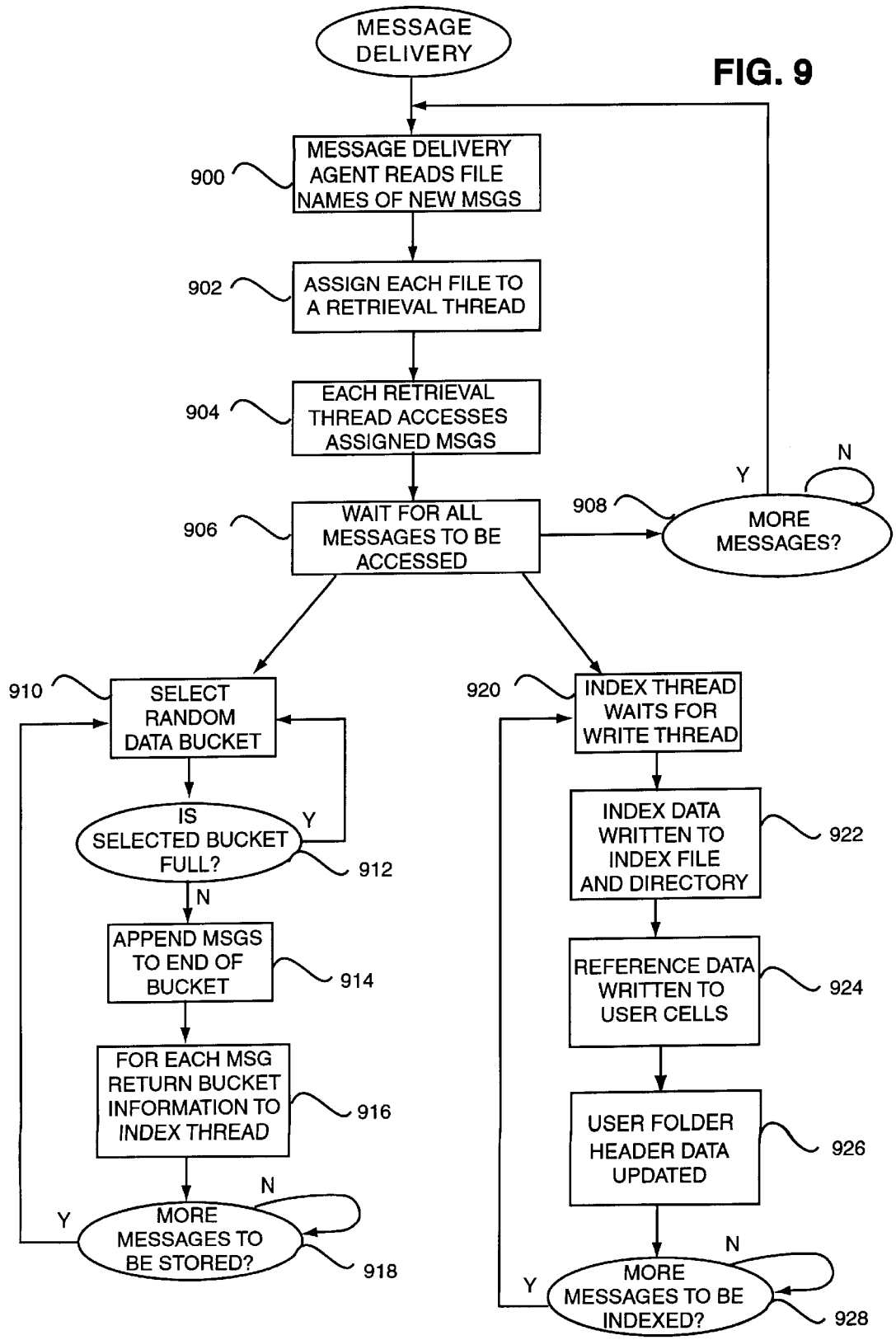
FIG. 9 is a flowchart showing the process of delivering a message to the message store of the present invention.

FIG. 9 is a flowchart showing the process of a message store master delivering messages to a message store in accordance with one embodiment of the present invention. As described with respect to FIG. 8, a message store master delivers new e-mail messages to the message store for users. It is assumed for the purposes of FIG. 9 that the message store master is running, i.e., it has already read the first message in the message store channel. At step 900 a message delivery agent reads the filenames of up to n new messages. In the described embodiment, the agent can read up to 10 new messages. In other preferred embodiments, the agent can read more or fewer messages. At step 902 each file, or message, is assigned to one retrieval thread. A retrieval thread is assigned to a file by making a call to API. At step 904 each retrieval thread accesses its assigned file in the message store channel 808 of FIG. 8. At step 906 the process waits for all n messages to be accessed in parallel. Once all the filenames read in step 900 have been assigned and accessed, a retrieval thread goes to step 908 where it checks for additional messages. It can do this once it determines that it can obtain n empty buffers. If there are no messages, the thread continues checking for new messages at step 908. If there are new incoming messages, the retrieval thread returns to step 900 where the message delivery agent reads the filenames of the new messages.

While the retrieval thread is checking for new messages, an index thread and a write thread are managing the n messages previously assigned and accessed by retrieval threads. The first step in writing the n messages to the message store is shown at step 910. At step 910 the write thread selects a data bucket by generating a random bucket number. In the described embodiment, there are typically three open data buckets in which the messages can reside. At step 912 the process determines if the selected data bucket 108 has any remaining memory. If not, it returns to step 910 to generate another random data bucket number, and continues this process, creating additional data buckets if necessary, until the messages can be written to the message store. If the data bucket is not full, the write thread appends the n messages to the end of the selected data bucket at step 914. At step 916, the write thread informs the index thread of the data bucket number, the bucket offset 309, and message size 521 of each of the messages appended at step 914. At step 918 the write thread checks if there are more messages that have been assigned and accessed by retrieval threads that need to be written to the message store. If so the write thread returns to step 910. If there are no new messages it continues checking at step 918.

The index thread begins storing index information in the index directories and files once the write thread is done writing to the message store. At step 920 the index thread waits for the write thread to complete writing the n messages to the message store and return the indexing information as described in step 916. It is possible that the index thread may have completed its previous indexing tasks and has to wait for the write thread to finish writing to the message store. At step 922 the index thread writes the index information to the index directory and index file. At step 924, reference information necessary for retrieving data in the index directory and file is written to the user folder cells. At step 924 information sufficient to reference the corresponding index spaces is written to the inbox folder cell or cells, depending on the number of recipients. At step 926 information in the user folder header is updated to indicate the addition of the new messages. After step 926 is complete, the index thread checks whether there is index information waiting to be indexed at 928. If so, the index thread returns to step 920 to begin indexing the information on messages already written to the message store.

The present invention employs various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms, such as, producing, identifying, running, determining, comparing, executing, downloading, or detecting. It is sometimes convenient, principally for reasons of common usage, to refer to these electrical or magnetic signals as bits, values, elements, variables, characters, data, or the like. It should remembered, however, that all of these and similar terms are to be associated with the appropriate physical quantities and are merely convenient labels applied to these quantities.

The present invention also relates to a device, system or apparatus for performing the aforementioned operations. The system may be specially constructed for the required purposes, or it may be a general purpose computer selectively activated or configured by a computer program stored in the computer. The processes presented above are not inherently related to any particular computer or other computing apparatus. In particular, various general purpose computers may be used with programs written in accordance with the teachings herein, or, alternatively, it may be more convenient to construct a more specialized computer system to perform the required operations.

Figure 10:
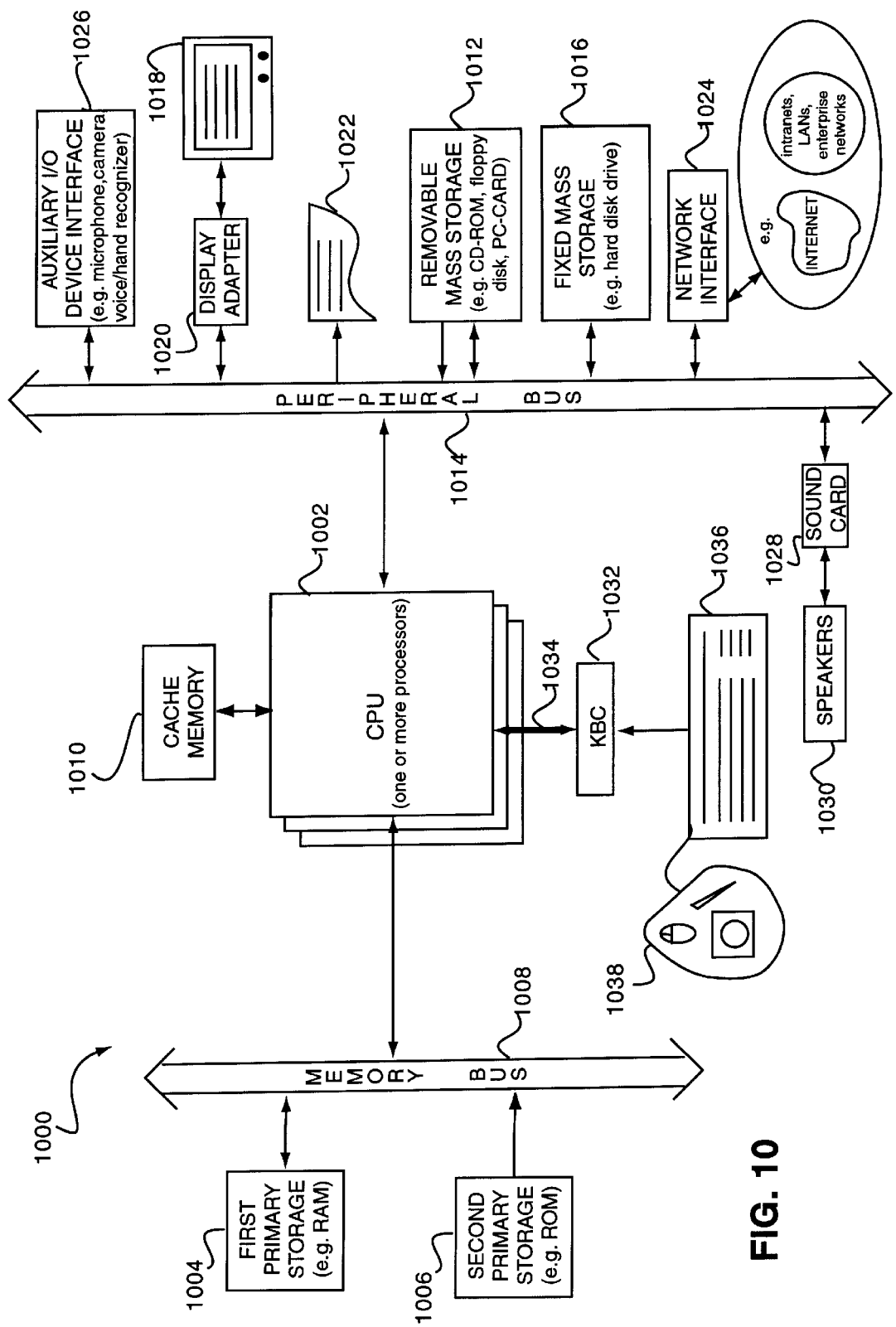
FIG. 10 is a block diagram of a typical computer system suitable for implementing the described embodiment of the present invention.

FIG. 10 is a block diagram of a general purpose computer system 1000 suitable for carrying out the processing in accordance with one embodiment of the present invention. FIG. 10 illustrates one embodiment of a general purpose computer system. Other computer system architectures and configurations can be used for carrying out the processing of the present invention. Computer system 1000, made up of various subsystems described below, includes at least one microprocessor subsystem (also referred to as a central processing unit, or CPU) 1002. That is, CPU 1002 can be implemented by a single-chip processor or by multiple processors. CPU 1002 is a general purpose digital processor which controls the operation of the computer system 1000. Using instructions retrieved from memory, the CPU 1002 controls the reception and manipulation of input data, and the output and display of data on output devices.

CPU 1002 is coupled bi-directionally with a first primary storage 1004, typically a random access memory (RAM), and uni-directionally with a second primary storage area 1006, typically a read-only memory (ROM), via a memory bus 1008. As is well known in the art, primary storage 1004 can be used as a general storage area and as scratch-pad memory, and can also be used to store input data and processed data. It can also store programming instructions and data, in the form of a message store in addition to other data and instructions for processes operating on CPU 1002, and is used typically used for fast transfer of data and instructions in a bi-directional manner over the memory bus 1008. Also as well known in the art, primary storage 1006 typically includes basic operating instructions, program code, data and objects used by the CPU 1002 to perform its functions. Primary storage devices 1004 and 1006 may include any suitable computer-readable storage media, described below, depending on whether, for example, data access needs to be bi-directional or uni-directional. CPU 1002 can also directly and very rapidly retrieve and store frequently needed data in a cache memory 1010.

A removable mass storage device 1012 provides additional data storage capacity for the computer system 1000, and is coupled either bi-directionally or uni-directionally to CPU 1002 via a peripheral bus 1014. For example, a specific removable mass storage device commonly known as a CD-ROM typically passes data uni-directionally to the CPU 1002, whereas a floppy disk can pass data bi-directionally to the CPU 1002. Storage 1012 may also include computer-readable media such as magnetic tape, flash memory, signals embodied on a carrier wave, PC-CARDS, portable mass storage devices, holographic storage devices, and other storage devices. A fixed mass storage 1016 also provides additional data storage capacity and is coupled bi-directionally to CPU 1002 via peripheral bus 1014. The most common example of mass storage 1016 is a hard disk drive. Generally, access to these media is slower than access to primary storages 1004 and 1006. Mass storage 1012 and 1016 generally store additional programming instructions, data, and the like that typically are not in active use by the CPU 1002. It will be appreciated that the information retained within mass storage 1012 and 1016 may be incorporated, if needed, in standard fashion as part of primary storage 1004 (e.g. RAM) as virtual memory.

In addition to providing CPU 1002 access to storage subsystems, the peripheral bus 1014 is used to provide access other subsystems and devices as well. In the described embodiment, these include a display monitor 1018 and adapter 1020, a printer device 1022, a network interface 1024, an auxiliary input/output device interface 1026, a sound card 1028 and speakers 1030, and other subsystems as needed.

The network interface 1024 allows CPU 1002 to be coupled to another computer, computer network, or telecommunications network using a network connection as shown. Through the network interface 1024, it is contemplated that the CPU 1002 might receive information, e.g., data objects or program instructions, from another network, or might output information to another network in the course of performing the above-described method steps. Information, often represented as a sequence of instructions to be executed on a CPU, may be received from and outputted to another network, for example, in the form of a computer data signal embodied in a carrier wave. An interface card or similar device and appropriate software implemented by CPU 1002 can be used to connect the computer system 1000 to an external network and transfer data according to standard protocols. That is, method embodiments of the present invention may execute solely upon CPU 1002, or may be performed across a network such as the Internet, intranet networks, or local area networks, in conjunction with a remote CPU that shares a portion of the processing. Additional mass storage devices (not shown) may also be connected to CPU 1002 through network interface 1024.

Auxiliary I/O device interface 1026 represents general and customized interfaces that allow the CPU 1002 to send and, more typically, receive data from other devices such as microphones, touch-sensitive displays, transducer card readers, tape readers, voice or handwriting recognizers, biometrics readers, cameras, portable mass storage devices, and other computers.

Also coupled to the CPU 1002 is a keyboard controller 1032 via a local bus 1034 for receiving input from a keyboard 1036 or a pointer device 1038, and sending decoded symbols from the keyboard 1036 or pointer device 1038 to the CPU 1002. The pointer device may be a mouse, stylus, track ball, or tablet, and is useful for interacting with a graphical user interface.

In addition, embodiments of the present invention further relate to computer storage products with a computer readable medium that contain program code for performing various computer-implemented operations. The computer-readable medium is any data storage device that can store data which can thereafter be read by a computer system. The media and program code may be those specially designed and constructed for the purposes of the present invention, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

It will be appreciated by those skilled in the art that the above described hardware and software elements are of standard design and construction. Other computer systems suitable for use with the invention may include additional or fewer subsystems. In addition, memory bus 1008, peripheral bus 1014, and local bus 1034 are illustrative of any interconnection scheme serving to link the subsystems. For example, a local bus could be used to connect the CPU to fixed mass storage 1016 and display adapter 1020. The computer system shown in FIG. 10 is but an example of a computer system suitable for use with the invention. Other computer architectures having different configurations of subsystems may also be utilized.

Although the foregoing invention has been described in some detail for purposes of clarity of understanding, it will be apparent that certain changes and modifications may be practiced within the scope of the appended claims. Furthermore, it should be noted that there are alternative ways of implementing both the process and apparatus of the present invention. For example, although the message store has been described using IMAP indexing, the message store can be similarly configured for other mail protocols to store multimedia data, or other types of data. In another example, although the fields of the various cells are described in a particular order, the order of the fields is not a required feature of the message store. Fields can be ordered differently, or may be omitted or added without affecting the performance and advantages of the present invention. Accordingly, the present embodiments are to be considered as illustrative and not restrictive, and the invention is not to be limited to the details given herein, but may be modified within the scope and equivalents of the appended claims.

What is claimed is:

1. An Internet Message Access Protocol (IMAP) message store for storing email messages and related data comprising:

a plurality of calendar-based and page based data buckets, each data bucket being suitable for containing a plurality of messages received within a predetermined time period, thereby reducing the need to process a large body of messages;

a calendar-based and page based index file including one or more index file pages, each index file page of the index file suitable for containing a plurality of index file cells having variable length to allow for the addition of fields and index information capable under IMAP, each index file cell arranged to store index information characterizing an associated one of the messages including a message-analyzed field to indicate whether a message is in IMAP protocol, and each index file corresponding to the predetermined time period; and a calendar-based and page based index directory including one or more index directory files, each index directory file corresponding to the predetermined time period, the index directory suitable for containing a plurality of index directory cells, each index directory cell arranged to store index directory information suitable for locating an associated index file cell, thereby being associated with the particular message associated with the index file cell;

wherein the index file and index directory allow for efficient use of IMAP indexing capabilities.

2. A message store as recited in claim 1 further comprising a plurality of calendar-based and page based user folders, each user folder being associated with a user and suitable for containing a plurality of user cells, each user cell being arranged to reference a message received within the predetermined time period associated with the user.

3. A message store as recited in claim 2 wherein each user cell includes a first index directory reference pointer to an index directory cell relating such user cell to its referenced message.

4. A message store as recited in claim 3 wherein each user cell further includes a user folder identifier indicative of which user folder contains the user cell.

5. A message store as recited in claim 3 wherein each user cell further includes an arrival time indicative of the time a referenced message arrives in the message store.

6. A message store as recited in claim 2 wherein each user folder includes a total size value indicative of the size of the message.

7. A message store as recited in claim 6 wherein each user folder further includes a next unique identifier for identifying a new user cell.

8. A message store as recited in claim 7 wherein each user folder further includes a last write date indicative of the date the most recent message referenced by the user folder was written to the message store.

9. A message store as recited in claim 6 wherein each user folder further includes a message count indicative of the number of messages referenced in the user folder.

10. A message store as recited in claim 2 wherein each user folder is categorized according to a predetermined user based criteria.

11. A message store as recited in claim 1 wherein each index directory cell includes a reference counter indicative of the number of users that are currently referencing the associated message.

12. A message store recited in claim 1 wherein each index directory cell includes a first index file reference pointer to an associated index file cell.

13. A message store as recited in claim 12 wherein the first index file reference pointer includes an index file offset indicative of a location of the index file cell in the index file and an associated index file cell size indicative of the size of the index file cell.

14. A message store as recited in claim 1 further comprising an index directory header including a cell number counter indicative of the number of index directory cells in a particular index directory page.

15. A message store as recited in claim 14 wherein the index directory header further includes a next location indicative of a location in the index directory for a new index directory cell.

16. A message store as recited in claim 15 wherein the index directory header further includes a data bucket counter indicative of the number of data buckets being used by an index directory page.

17. A message store as recited in claim 1 wherein each index file cell includes an index file cell size indicative of the size of the index file cell thereby facilitating internal consistency testing.

18. A message store as recited in claim 1 wherein each index file cell includes a message pointer to the associated message in the associated data bucket.

19. A message store as recited in claim 18 wherein the message pointer includes a data bucket identifier, identifying a data bucket containing the associated message and a data bucket offset indicative of a location of the associated message in the identified data bucket.

20. A message store as recited in claim 1 wherein each index file cell includes an associated message size.

21. A message store as recited in claim 1 wherein each index file cell includes an associated message section offset list indicative of locations of message sections in an associated data bucket.

22. A message store as recited in claim 1 wherein a message is comprised of preamble data and message data, the message data including actual data conveyed by a user.

23. A message store as recited in claim 22 wherein:
the preamble data includes a message size indicative of the size of the message; and
the preamble data includes a second index file reference pointer to an associated index file cell.

24. A message store as recited in claim 22 wherein the preamble data includes a second index directory reference pointer to an associated index directory cell.

25. A message store as recited in claim 24 further comprising:
a first index directory reference pointer in a user cell;
a first index file reference pointer in an index directory cell;
a second index file reference pointer in the message; and
a message pointer in the index file cell;
wherein such pointers in combination with the second index directory reference pointer in the preamble data enable the message store to perform internal consistency testing and reconstruct pages of the message store is required.

26. A message store as recited in claim 24 further comprising:
a first index file reference pointer in an index directory cell;
a message pointer in the index file cell; and
a second index file reference pointer in the message;
wherein such pointers in combination with the second index directory reference pointer in the preamble data form a self-contained referencing mechanism within the data buckets, index file, and index directory.

27. A message store as recited in claim 22 wherein the preamble data includes a message sender name and a recipient count, the recipient count indicative of the number of users who reference the message.

28. A method of storing an incoming message in an Internet Message Access Protocol (IMAP) message store, the method comprising:
appending the incoming message, received within a predetermined time period, thereby reducing the need to process a large body of messages, to a calendar-based and page based data bucket portion of the IMAP message store, without substantially hindering access to existing messages in the IMAP message store;
indexing the incoming message thereby creating an index file cell and index directory, wherein the index file cell is of variable length to allow for the addition of fields and index information capable under IMAP and wherein all of the indexing is done while the incoming message is appended to the calendar-based and page based data bucket and wherein the index file cell and index directory correspond to the predetermined time period; and
appending the index file cell to an index file of the IMAP message store; and
appending the index file cell to the index directory, such that the index file and index directory allow for efficient use of indexing capabilities inherent in IMAP.

29. A method as recited in claim 28 wherein the incoming message is appended to the data bucket portion of the IMAP message store without hindering access to the index file of the IMAP message store.

30. A method as recited in claim 28 wherein indexing the incoming message further includes obtaining data on the data bucket portion of the IMAP message store to be included in the index file cell corresponding to the incoming message.

31. A method as recited in claim 28 further including restricting access to an unused section of the data bucket portion of the IMAP message store while the incoming message is appended to the data bucket portion of the IMAP message store.

32. A computer-readable medium on which is embodied an IMAP message store, the message store comprised of:
a plurality of calendar-based and page based data buckets, each data bucket being suitable for containing a plurality of messages received within a predetermined time period, thereby reducing the need to process a large body of messages;
a calendar-based and page based index file including one or more index file pages, each index file page of the index file suitable for containing a plurality of index file cells having variable length to allow for the addition of fields and index information capable under IMAP, each index file cell arranged to store index information characterizing an associated one of the messages including a message-analyzed field to indicate whether a message is in IMAP protocol, and each index file corresponding to the predetermined time period; and a calendar-based and page based index directory including one or more index directory files, each index directory file corresponding to the predetermined time period, the index directory suitable for containing a plurality of index directory cells, each index directory cell arranged to store index directory information suitable for locating an associated index file cell, thereby being associated with the particular message associated with the index file cell;

wherein the index file and index directory allow for efficient use of IMAP indexing capabilities.

33. A computer-readable medium as recited in claim 32, further comprising:

a plurality of calendar-based and page based user folders, each user folder being associated with a user and suitable for containing a plurality of user cells, each user cell being arranged to reference a message received within the predetermined time period associated with the user.

34. A computer-readable medium as recited in claim 33 wherein each user cell includes a first index directory reference pointer to an index directory cell thereby relating such user cell to its referenced message.

35. A computer-readable medium as recited in claim 34 wherein each user cell further includes a user folder identifier indicative of which user folder contains the user cell.

36. A computer-readable medium containing programming instructions for storing an incoming message in an IMAP message store, the computer-readable medium comprising computer program code devices configured to cause a computer to execute the steps of:

appending the incoming message, received within a predetermined time period, thereby reducing the need to process a large body of messages, to a calendar-based and page based data bucket portion of the IMAP message store, without substantially hindering access to existing messages in the IMAP message store;

indexing the incoming message thereby creating an index file cell and index directory, wherein the index file cell is of variable length to allow for the addition of fields and index information capable under IMAP and wherein all of the indexing is done while the incoming message is appended to the calendar-based and page based data bucket and wherein the index file cell and index directory correspond to the predetermined time period; and appending the index file cell to an index file of the IMAP message store; and appending the index file cell to the index directory, such that the index file and index directory allow for efficient use of indexing capabilities inherent in IMAP.

37. A computer-readable medium as recited in claim 36 further comprising computer program code devices configured to cause a computer to execute the step of restricting access to an unused section of the data bucket portion of the message store while the incoming message is appended to the data bucket portion of the message store.

38. A computer data signal embodied in a carrier wave and representing sequences of instructions which, when executed by a processor, cause the processor to store an incoming message in a message store by performing the steps of:

appending the incoming message, received within a predetermined time period, thereby reducing the need to process a large body of messages, to a calendar-based and page based data bucket portion of the IMAP message store, without substantially hindering access to existing messages in the IMAP message store;

indexing the incoming message thereby creating an index file cell and index directory, wherein the index file cell is of variable length to allow for the addition of fields and index information capable under IMAP and wherein all of the indexing is done while the incoming message is appended to the calendar-based and page based data bucket and wherein the index file cell and index directory correspond to the predetermined time period; and appending the index file cell to an index file of the IMAP message store; and appending the index file cell to the index directory, such that the index file and index directory allow for efficient use of indexing capabilities inherent in IMAP.

\* \* \* \* \*